United States Patent
Jeffries et al.

(10) Patent No.: US 10,129,292 B2
(45) Date of Patent: *Nov. 13, 2018

(54) FRONT-END PROTOCOL FOR SERVER PROTECTION

(75) Inventors: Clark Debs Jeffries, Durham, NC (US); Mohammad Peyravian, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 600 days.

This patent is subject to a terminal disclaimer.

(21) Appl. No.: 13/495,210

(22) Filed: Jun. 13, 2012

(65) Prior Publication Data

US 2012/0260335 A1   Oct. 11, 2012

Related U.S. Application Data

(63) Continuation of application No. 10/937,695, filed on Sep. 9, 2004, now Pat. No. 8,250,650.

(51) Int. Cl.
*H04L 29/06* (2006.01)
(52) U.S. Cl.
CPC ................ *H04L 63/1458* (2013.01)
(58) Field of Classification Search
None
See application file for complete search history.

(56) References Cited

U.S. PATENT DOCUMENTS

| | | |
|---|---|---|
| 7,143,163 B1 | 11/2006 | Bleichenbacher et al. |
| 7,197,639 B1 | 3/2007 | Juels et al. |
| 7,694,335 B1 | 4/2010 | Turner et al. |
| 2003/0023743 A1 | 1/2003 | Raphel et al. |
| 2004/0093371 A1 | 5/2004 | Burrows et al. |
| 2004/0139152 A1 | 7/2004 | Kaler et al. |
| 2004/0143670 A1 | 7/2004 | Roychowdhury et al. |
| 2005/0216954 A1* | 9/2005 | Ramaiah et al. ............... 726/22 |
| 2005/0249214 A1 | 11/2005 | Peng |

OTHER PUBLICATIONS

Xiaofeng Wang; Reiter, M.K., "Defending against denial-of-service attacks with puzzle auctions," Security and Privacy, 2003. Proceedings. 2003 Symposium on , vol., No., pp. 78-92, May 11-14, 2003 URL: http://ieeexplore.ieee.org/stamp/stamp.jsp?arnumber=1199329 &isnumber=27002.

(Continued)

*Primary Examiner* — Jeffery L Williams
(74) *Attorney, Agent, or Firm* — James L. Baudino

(57) ABSTRACT

The present invention provides for protecting against denial of service attacks. A request is sent by a client, the request comprises client indicia. The request is received at a server. A request count is incremented by the server. A sequence number is assigned as a function of the client indicia. A problem is selected by the server. The problem is sent by the server to the client. A solution to the problem is sent to the server. It is determined if the solution by client is correct. If the solution is correct, a session is performed. If the solution is not correct, the request is discarded. This can substantially decrease the amount of attacks performed by a rogue client, as the session set-up time can be substantial.

15 Claims, 3 Drawing Sheets

(56) References Cited

OTHER PUBLICATIONS

Aura, T., Nikander, P., and Leiwo, J. 2001. DOS-Resistant Authentication with Client Puzzles. In Revised Papers From the 8th international Workshop on Security Protocols (Apr. 3-5, 2000). B. Christianson, B. Crispo, and M. Roe, Eds. Lecture Notes in Computer Science, vol. 2133. Springer-Verlag, London, 170-177.
Back, A., "Hashcash: A Denial of Service Counter-Measure", 2002, http://citeseer.nj.nec.com/back02hashcash.html, Accessed Oct. 20, 2008.
Price, G., "A General Attack Model on Hash-Based Client Puzzles", 2003, Cryptography and Coding 2003, Springe-Verlag Berlin Heidelberg, p. 319-331.
Ari Juels and John Brainard. Client puzzles: A cryptographic countermeasure against connection depletion attacks. In Proc. 1999 Network and Distributed Systems Security Symposium (NDSS), pp. 151-165, San Diego, CA, Feb. 1999. Internet Society.
Abadi et al., "Moderately hard, memory-bound functions", 2003, In Proceedings of the 10th Annual Network and Distributed System Security Symposium, pp. 1-15.
Forouzan, Behrouz, Data Communications and Networking, 3rd ed., Jul. 14, 2003, McGraw-Hill, p. 267-291, 593-626.

\* cited by examiner

| INDEX | 0 | 1 | ... | K-1 |
|---|---|---|---|---|
| PROBLEM | $(4359)^{53565}$ mod 96377 | $(7048)^{45857}$ mod 78641 | ... | $(3365)^{72874}$ mod 56435 |
| SOLUTION | 35105 | 47875 | ... | 45403 |
*FIG. 2*
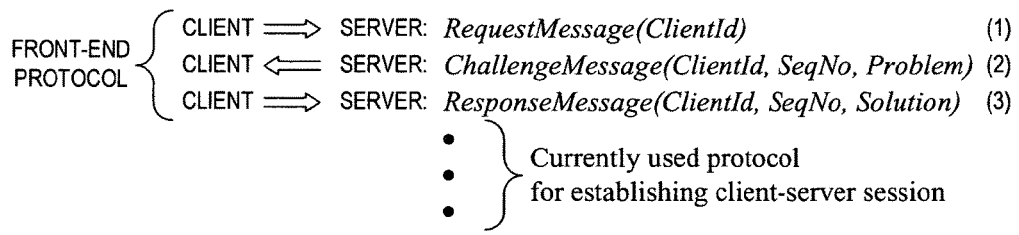
*FIG. 3*
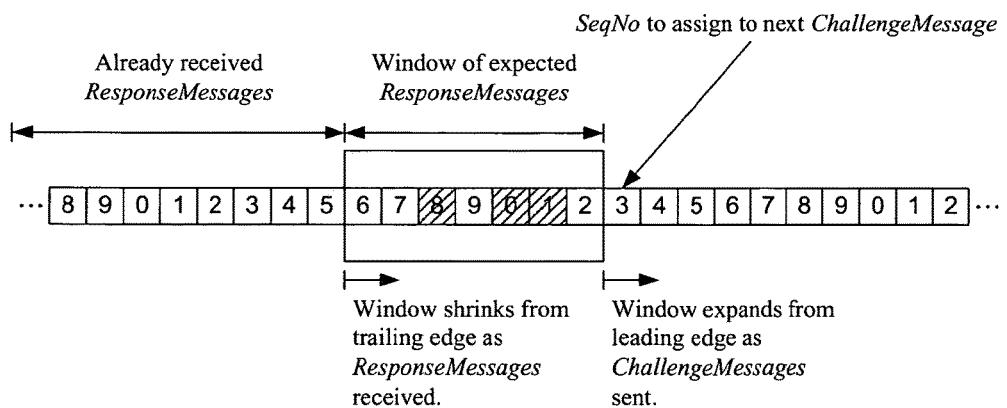
*FIG. 4*

FRONT-END PROTOCOL FOR SERVER PROTECTION

TECHNICAL FIELD

The present invention relates generally to computer security and, more particularly, to denial of service attacks.

BACKGROUND

In a Denial of Service (DoS) attack, a human adversary employs one or more client computers connected to the Internet, and compromises them by installing a DoS software on them. The human adversary then commands the compromised computers, using the installed DoS software, to send large volume of traffic having bogus requests to an Internet-connected server requesting services from it. It is possible that the server could not be able to differentiate between a legitimate request and a bogus request, since a bogus request can have the correct format as a legitimate request. Thus, the victim server gets overwhelmed by the large amount of requests and cannot even provide services to legitimate requests. DoS attacks are primarily launched against high-profile web sites/servers such as Yahoo®, E-Trade®, Amazon®, CNN®, and so on.

Therefore, there is a need for a countermeasure solution for protecting servers against DoS attacks that enables victim servers to sustain service availability during such attacks in such a manner that addresses at least some of the problems associated with conventional countermeasures.

SUMMARY OF THE INVENTION

The present invention provides for protecting against denial of service attacks. A request is sent by a client, the request comprises client indicia. The request is received at a server. A request count is incremented by the server. A sequence number is assigned as a function of the client indicia. A problem is selected by the server. The problem is sent by the server to the client. A solution to the problem is sent to the server. It is determined if the solution by client is correct. If the solution is correct, a session is performed. If the solution is not correct, the request is discarded.

BRIEF DESCRIPTION OF THE DRAWINGS

For a more complete understanding of the present invention, and the advantages thereof, reference is now made to the following Detailed Description taken in conjunction with the accompanying drawings, in which:

FIG. 2 illustrates an example of a problem-solution table employed in FIG. 1;

FIG. 3 illustrates front-end protocol exchanges;

FIG. 4 illustrates a window maintained by the server of FIG. 1; and

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
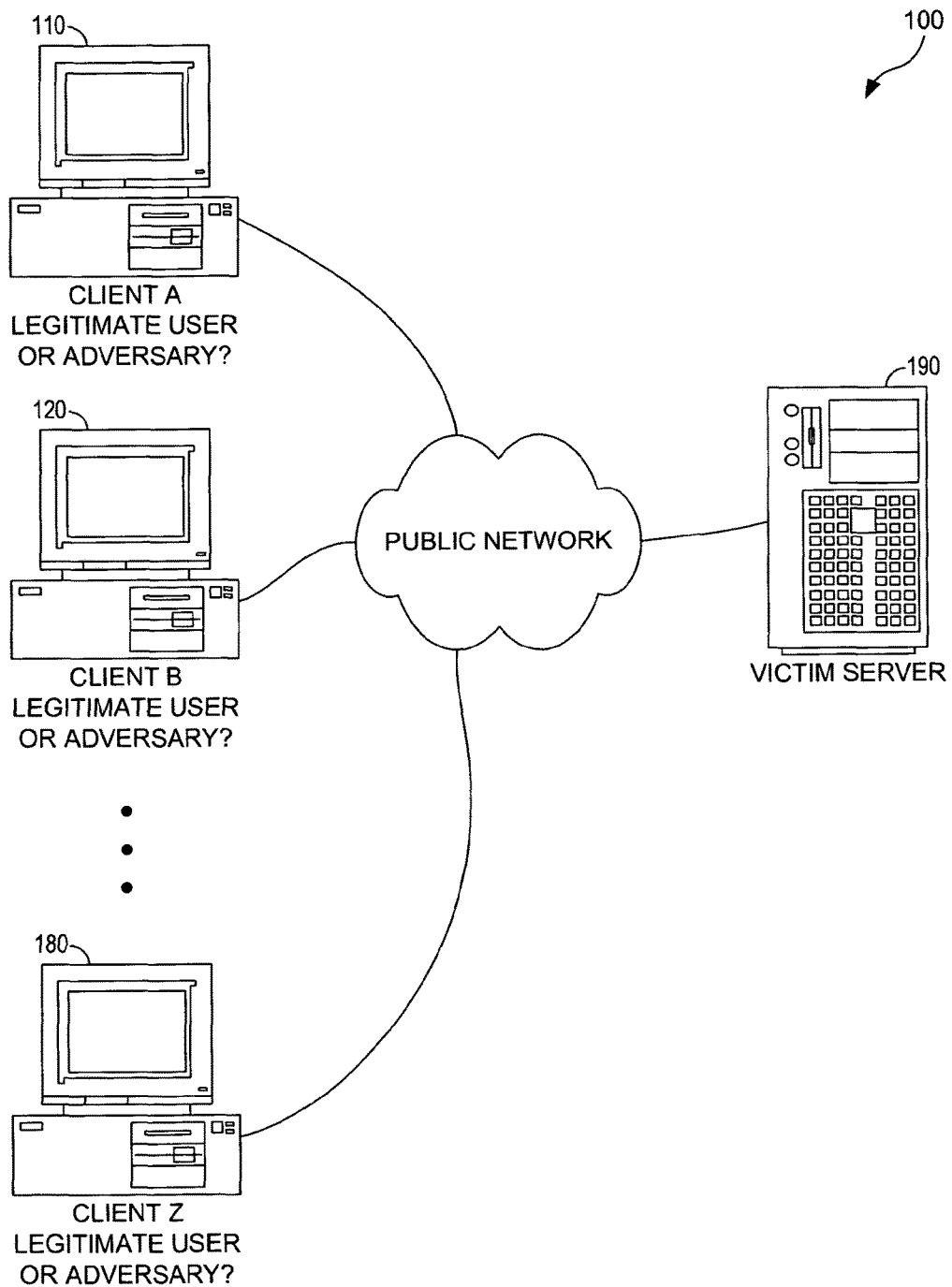
FIG. 1 schematically depicts a client server system in which denial of service attacks can occur.

Turning to FIG. 1, illustrated is a client-server model 100 in which many clients 110, 120 . . . 180 can request services from a coupled server 190. The clients 110-180 could be a legitimate client which sends legitimate requests for service to the server 190, or it could be an adversary client which sends bogus requests to the server to create a DoS attack. The server 190 might not be able to differentiate between a legitimate request and a bogus request, since a bogus request can have the correct format as a legitimate request.

In the system 100, a generic front-end protocol is defined between the client 110-180 and server 190 to protect the computing and storage resources on the server 190 from being depleted by adversary clients that send bogus requests for service to the server. This is a generic solution and can be used as a front-end to any session protocols used between a client 110-180 and server 190 in which the client requests some type of a service from the server 190.

The system 100 does not require substantial changes to the existing protocols used between the client 110-180 and server 190. Generally, the system 100 adds a protection layer, that is, the front-end protocol, beneath the current or any future protocols. One use of the front-end protocol is to protect the server 190 against DoS attacks by making the server obtain some level of assurance from the client 110-180 that the client is a legitimate client before the server 190 honors its request for service, and getting engaged in a subsequent session protocol with the client. Moreover, the front-end protocol helps ensure that the computing and storage resources on the server 190 will not be depleted and legitimate clients 110-180 can still receive services from the server 190 in the face of DoS attacks.

Turning now to FIG. 2, illustrated is an example of a problem-solution table with K entries that is maintained by the server 190. The "a mod b" operation in FIG. 2 denotes the modulo operation that produces the remainder of a divided by b. This example problem-solution table is intended to illustrate one embodiment of designing such a table using the exponentiation and modulo operations. Many other operations can be used and the computational intensity for the problem can vary as well.

Typically, the front-end protocol works as follows. Before the client 110-180 can request a service from the server 190 and establish a session, the client 110-180 first sends a "RequestMessage". The RequestMessage contains the ClientId, that is, the client identifier. The ClientId can be any unique ID, such as the IP (Internet Protocol) address. It is not required that the server 190 knows the ClientId ahead of time before receiving the RequestMessage from the client 110-180.

In reply to the RequestMessage, the server then sends a ChallengeMessage back to the client. The ChallengeMessage contains the ClientId, a sequence number, that is, the SeqNo. The sequence number correlates to the ChallengeMessage with the ResponseMessage, as will be described later within this document. It is not the same as the index number. Furthermore, a Problem is sent from the server problem-solution table. Generally, the time for the client 110-180 to calculate the answer is a non-trivial time frame, thereby reducing the number of mass DoS attacks an adversarial client can make in a given time period.

The server 190 also maintains a SessionCount parameter. The SessionCount indicates the number of active, on-going sessions with clients 110-180 that the server 190 is supporting at any given time. Initially, when the server 190 boots up, it sets SessionCount to zero. Each time a session is established with a client 110-180, the server 190 adds one to SessionCount. Each time a session with a client 110-180 is terminated, the server 190 subtracts one from the SessionCount. A threshold value "S" specifies the maximum number of concurrent sessions that the server 190 is able to support with clients 110-180. The value of S depends on the computing power and storage capacity on the server 190. Thus, at any given time $$0 \leq SessionCount \leq S$$

The server 190 also maintains a RequestCount parameter. The server 190 initially sets RequestCount to zero. Each time the server 190 sends a ChallengeMessage to a client 110-189, it adds one to RequestCount. Only when RequestCount<S, can the sever 190 send ChallengeMessages to clients. When RequestCount=S, if the server 190 receives a RequestMessage from a client, 110-180 the server 190 discards the RequestMessage and does not send a ChallengeMessage back to the client 110-180.

Each time a session with a client is terminated, the server 190 not only subtracts one from SessionCount but it also subtracts one from RequestCount. If RequestCount=S for some time greater than a threshold time T, then the sever 190 sets RequestCount=SessionCount if SessionCount<S. This ensures that the server 190 will eventually honor requests for service from clients 110-180 even in the face of DoS attacks or when ChallengeMessages or ResponseMessages are not received correctly (for example due to messages being lost in transmission). Typically, the RequestCount is always greater than or equal to SessionCount since some client 110-180 requests for establishing sessions with the server 190 might not actually lead to active session establishments.

Turning now to FIG. 3, illustrated are some typical front-end protocol exchanges. The ChallengeMessage sent from the server 190 to a client 110-180 in flow (2) includes a SeqNo. The SeqNo is used to keep track of the ChallengeMessage, and to associate it with the corresponding ResponseMessage expected from the client 110-180. The ResponseMessage from the client 110-180 also contains the SeqNo sent with the ChallengeMessage.

Typically, the server 190 maintains a circular sequence number space 0 through N−1, where N≥S and N≥K. That is, the sequence numbers are:

..., 0, 1, 2, ..., N−2, N−1, 0, 1, 2, ..., N−2, N−1, 0, 1, 2, ...

The server 190 assigns the SeqNo for a ChallengeMessage from its sequence number space. Initially, when the server 190 boots up, it assigns 0 to SeqNo for the first ChallengeMessage it sends, 1 to SeqNo for the second ChallengeMessage it sends, 2 to SeqNo for the third ChallengeMessage it sends, and so forth.

Turning now to FIG. 4, illustrated is a "window" maintained by the server 190 over its sequence number space. The window contains the SeqNos of ChallengeMessages sent by the server. The window further indicates the SeqNos that the server 190 expects to see in ResponseMessages from clients 110-180.

Typically, the size of the window of FIG. 4 is always less than or equal to S. Initially, when the server 190 boots up and assigns 0 to SeqNo for the first ChallengeMessage, the server 190 sets the trailing edge and the leading edge of the window to 0. From then on, each time the server 190 wants to send a ChallengeMessage, it first advances the leading edge of the window by one and then assigns the leading edge number to the SeqNo for the ChallengeMessage.

When the server 190 receives a ResponseMessage with a SeqNo that falls within the window of FIG. 4, the server 190 performs as follows. If the SeqNo is not the same as the window's trailing edge number, the server 190 marks the SeqNo within the window as a ResponseMessage that is received out-of-sequence. Referring to FIG. 4, if the received SeqNo is 9, then the server 190 marks 9 within the window. Otherwise, if the SeqNo is the same as the window's trailing edge number, then the server 190 shrinks the window from the trailing edge by one.

Referring to FIG. 4, however if the received SeqNo is 6, then the server 190 changes the window's trailing edge from 6 to 7. Additionally, when the window's trailing edge becomes a marked number, the server 190 shrinks the trailing edge to the next unmarked number within the window if at least one such unmarked number within the window exists. In FIG. 4, if the window's trailing edge becomes 8 (which is a marked number), the server 190 shrinks the trailing edge to 9.

When the server receives a ResponseMessage with a SeqNo that falls outside the window, or otherwise corresponds to a marked number within the window, the server 190 simply discards the ResponseMessage with no further action. This helps to protect against replay attacks or bogus ResponseMessages from adversary clients 110-180.

The ResponseMessage from a client 110-180 to the server 190 contains the ClientId, SeqNo and Solution. The ResponseMessage must contain the correct Solution, that is, answer, to the Problem sent in the ChallengeMessage. If the received SeqNo falls within the server window and corresponds to an unmarked number, the server 190 then agrees to engage in a subsequent session protocol with the client 110-180 if the received Solution is correct. Otherwise, the server 190 ignores the client's 110-180 request and takes no further action.

When the server 190 decides to send a ChallengeMessage back to the client 110-180, the server 190 needs to assign a Problem from the problem-solution to the ChallengeMessage. The assignment can be done in many ways. One way is to compute the mod of the assigned SeqNo over K, that is, the number of entries in the problem-solution table, and use that as the Index for the problem for the ChallengeMessage. That is, $$\text{Index} = \text{SeqNo} \bmod K$$

The server 190 need not advertise K to the public and could periodically update the problem-solution table by changing the problems. When the server 190 receives a ResponseMessage from a client 110-180, the server 190 can quickly verify the correctness of the Solution contained in the ResponseMessage. The server 190 simply computes the Index using the SeqNo contained in the ResponseMessage, as shown above and looks up the Solution in the problem-solution table, such as illustrated in FIG. 2. If the Solution contained in the ResponseMessage is the same as the one in the table then the received Solution is correct.

A client 110-180 might not receive a ChallengeMessage back from the server 190 in reply to its RequestMessage, or alternatively the ResponseMessage might not make it to the server 190. This could happen if the server 190 has already reached its maximum capacity, as described above, or it could be due to message/packet loss in transmission. Thus, if the client's 110-180 initial request does not lead to a successful session establishment with the server 190, the client 110-180 should retry sending periodic requests several times before giving up.

Generally, the system 100 is directed to a generic front-end solution for protecting against DoS attacks. The system 100 is typically light weight and does not require changes to existing protocols, and does not require the use of cryptographic techniques. Moreover, it does not require the server 190 to perform computationally intensive operations and maintain state information about individual requests from clients. The server 190 leaves the burden on the client to prove its legitimacy (through the disclosed front-end protocol) before agreeing to engage in session establishment.

Figure 5:
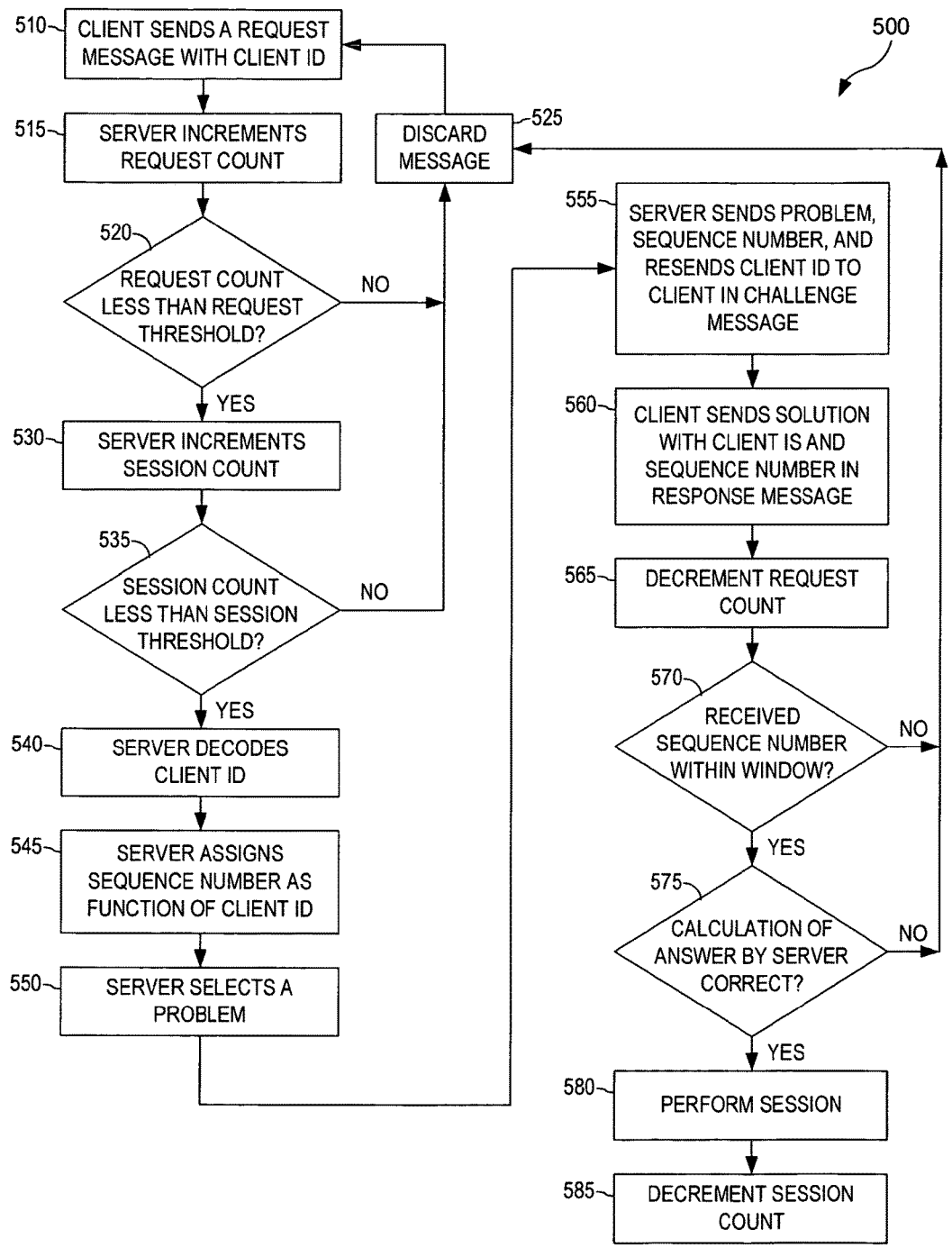
FIG. 5 illustrates a method for protecting against denial of service attacks.

Turning now to FIG. 5, illustrated is a method 500 for practicing the system 100. In step 510, a client sends a RequestMessage with a client ID. In step 515, the server 190 receives the request, and increments the request count. In step 520, it is determined if the requestcount less than allowable request threshold. If yes, in step 530, the server 190 increments the session count. If no, then in step 525, the message is discarded.

After step 520, in step 535, it is determined if the session count is less than the session threshold. If it is not, than the message is discarded in step 525. If it is less, then in step 540, the server decodes the client ID. In step 545, the server 190 assigns a sequence number (SEQ_NO) as a function of the received client ID. In step 550, the server selects a problem. In step 555, the server 190 sends the problem, the sequence number and resends the client ID to client in a challenge message ChallengeMessage. In step 560, the client sends the solution with client ID, sequence number in a ResponseMessage.

In step 565, requestcount is decremented. In step 570, it is determined whether the received sequence number from the client in the ResponseMessage is within the accepted reply window. If it is not within the accepted reply window, then the message is discarded in step 525. If it is within the accepted reply window, then in step 575, it is determined whether the client sent the correct solution. If it did not send the correct solution, then the message is discarded in step 525. If it did send the correct solution, then the session is performed in step 580. Finally, the session count is decremented in step 585.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for protecting a server against denial of service attacks, comprising:
    maintaining, by a server having a processing device, a window over a sequence number space, the sequence number space including sequence numbers that are sequentially assigned by the server to respective challenge messages issued by the server for verifying legitimate requests for service, the window comprising a leading edge and a trailing edge, the window expanding from the leading edge as respective challenge messages are sent and shrinking from the trailing edge as certain response messages are received;
    receiving a request;
    determining a challenge message should be sent;
    selecting a leading edge sequence number as a first challenge sequence number;
    assigning the first challenge sequence number to a challenge message;
    assigning a problem to the challenge message;
    sending the challenge message, wherein the challenge message comprises the problem and the first challenge sequence number;
    receiving a response message, wherein the response message comprises a solution to the problem and a second challenge sequence number;
    verifying that the second challenge sequence number included with the response message is within the window;
    responsive to verifying that the second challenge sequence number included with the response message is within the window, verifying that the solution included with the response message is correct; and
    performing a session if the solution is correct.

2. The method of claim 1, wherein the determining a challenge message should be sent comprises determining a request count does not exceed a threshold session count, and wherein the sending the challenge message comprises incrementing the request count.

3. The method of claim 2, wherein the performing a session comprises:
    incrementing a session count when the session is established; and
    decrementing a session count when the session is terminated;

and wherein the method further comprises:
setting the request count to the session count if the request count equals the threshold session count for a time greater than a threshold time.

4. The method of claim 1, wherein the assigning a problem to the challenge message further comprises assigning the problem as a function of the first challenge sequence number.

5. The method of claim 1, wherein:
the request comprises a client indicia;
the challenge message further comprises the client indicia; and
the response message further comprises the client indicia.

6. The method of claim 1, wherein the assigning a problem to the challenge message further comprises assigning a problem from a problem-solution table.

7. The method of claim 6, wherein the problem-solution table is periodically updated by changing the problems.

8. The method of claim 1, wherein assigning the problem comprises:
computing an index based on a number of entries in a problem-solution table and the first challenge sequence number; and
selecting the problem based on the index.

9. The method of claim 8, further comprising:
responsive to receiving the response message, computing an index based on the second challenge sequence number in the response message;
identifying a solution from the problem-solution table based on the index computed from the response message; and
comparing the solution from the problem-solution table with the solution from the response message.

10. A computer program product for protecting against a denial of service attacks, the computer program product embodied on a computer readable storage device, the computer program product comprising:
computer code for maintaining a window over a sequence number space, the sequence number space including sequence numbers that are sequentially assigned by a server to respective challenge messages issued by the server for verifying legitimate requests for service, the window comprising a leading edge and a trailing edge, the window expanding from the leading edge as respective challenge messages are sent and shrinking from the trailing edge as certain response messages are received;
computer code for receiving a request;
computer code for selecting a challenge sequence number from the sequence number space;
computer code for assigning the challenge sequence number to a challenge message;
computer code for assigning a problem to the challenge message;
computer code for sending the challenge message, wherein the challenge message comprises the problem and the challenge sequence number;
computer code for receiving a response message, wherein the response message comprises a solution to the problem and the challenge sequence number;
computer code for discarding the response message if the challenge sequence number is not within the window;
computer code for discarding the response message if the solution is not correct; and
computer code for performing a session if the response message is not discarded.

11. The computer program product of claim 10, wherein the computer code for assigning the problem comprises:
computer code for computing an index based on a number of entries in a problem-solution table and the challenge sequence number; and
computer code for selecting the problem based on the index.

12. The computer program product of claim 11, further comprising:
computer code for, responsive to receiving the response message, computing an index based on the challenge sequence number in the response message;
computer code for identifying a solution from the problem-solution table based on the index computed from the response message; and
computer code for comparing the solution from the problem-solution table with the solution from the response message.

13. A system for protecting against a denial of service attacks in a computer system, the system comprising a processor coupled to a non-transitory computer readable medium storing a computer program, the computer program comprising:
computer code for maintaining a window over a sequence number space, the sequence number space including sequence numbers that are sequentially assigned by a server to respective challenge messages issued by the server for verifying legitimate requests for service, the window comprising a leading edge and a trailing edge, the window expanding from the leading edge as respective challenge messages are sent and shrinking from the trailing edge as certain response messages are received;
computer code for receiving a request;
computer code for selecting a challenge sequence number from the sequence number space;
computer code for assigning the challenge sequence number to a challenge message;
computer code for assigning a problem to the challenge message;
computer code for sending the challenge message, wherein the challenge message comprises the problem and the challenge sequence number;
computer code for receiving a response message, wherein the response message comprises a solution to the problem and the challenge sequence number;
computer code for discarding the response message if the challenge sequence number is not within the window;
computer code for discarding the response message if the solution is not correct; and
computer code for performing a session if the response message is not discarded.

14. The system of claim 13, wherein the computer code for assigning the problem comprises:
computer code for computing an index based on a number of entries in a problem-solution table and the challenge sequence number; and
computer code for selecting the problem based on the index.

15. The system of claim 14, further comprising:
computer code for, responsive to receiving the response message, computing an index based on the challenge sequence number in the response message;
computer code for identifying a solution from the problem-solution table based on the index computed from the response message; and
computer code for comparing the solution from the problem-solution table with the solution from the response message.

* * * * *